Aug. 19, 1958  G. CARLSON  2,848,134
LOCKING MEANS FOR A FABRICATED BOX
Filed May 20, 1955
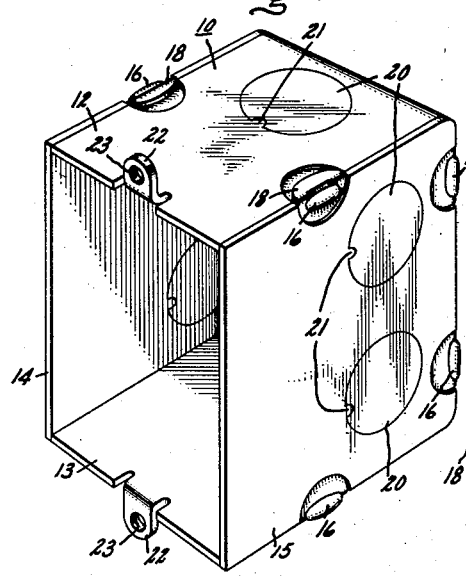
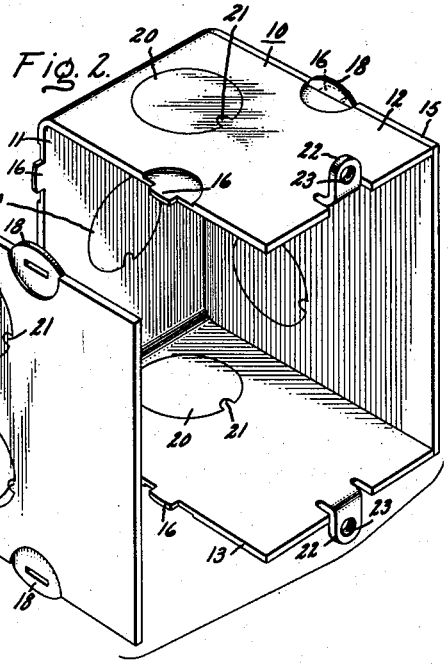
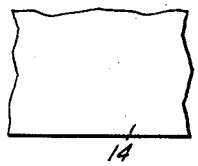
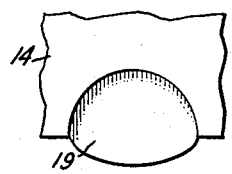
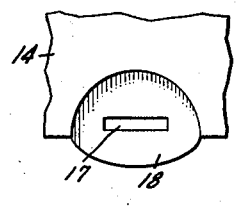
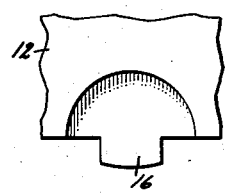
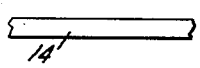
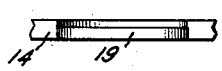
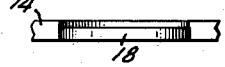
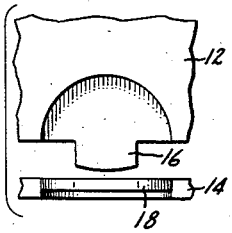
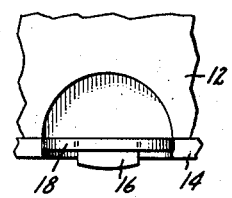
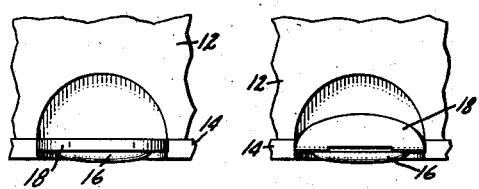
Inventor:
George Carlson,
by Allard A. Braddock
His Attorney.

United States Patent Office 2,848,134
Patented Aug. 19, 1958

2,848,134

LOCKING MEANS FOR A FABRICATED BOX

George Carlson, Trumbull, Conn., assignor to General Electric Company, a corporation of New York Application May 20, 1955, Serial No. 509,777

2 Claims. (Cl. 220—3.94)

The present invention relates to a fabricated metal box and particularly to an electric switch box for house wiring system such as is used to support a wall switch, a convenience outlet, or a similar device.

At the present time most of the electric switch boxes are made of sheet steel by three methods; namely, by drawing the sheet material into shape by stamping successively as with a series of dies, or by blanking the box out of the sheet steel and folding the sides together so that they may be locked in place, or by assembling separate plate members together as in the present invention to form a fabricated box. In both drawn and folded boxes there is usualy a waste of about 30 percent of the box material. If this large scrap loss could be lessened or perhaps eliminated, the cost of manufacturing these boxes would be reduced appreciably. In order to approach the ultimate of 100 percent utilization of the sheet steel material, it is deemed expedient to turn to fabricated boxes having two or more separate parts that are joined together to form a box. Fabricated boxes, which are not new in this art, commonly employ a three-piece assembly consisting of a U-shaped body and two side plates to complete the enclosure. However, since these parts are blanked from large rolls of sheet steel to have several securance flanges or tabs and mounting projections along the edges of the separate plate members, there is a resulting waste of about 20 percent of the material. These tabs and projections are made by trimming back the edges of the material to leave only the desired projecting portions.

According to my invention, I am also using a fabricated box design having a U-shaped body with a bottom wall and opposed end walls and separate side walls attached to the body along the side edges thereof to form a complete box. My invention is primarily concerned with the means for attaching the separate side walls to the body by using interlocking tabs that are formed by a novel method without a waste of any of the sheet material as in the prior art. These tabs may be drawn, coined, or pinched-out of the edges of the material by using one or more suitable punches (not shown) which reduce the thickness of small areas of the plate material so that the excess material will flow outwardly of the edge and be formed into securance tabs. Two types of tabs may be used to join the adjacent plate members together. One is a pierced tab having a rectangular slot and the other is a male tab that is to be locked therein. Moreover, it is felt that the term "pinch-out" is a rather colorful way of describing the formation of the tabs where it is possible to obtain "material for nothing."

The principal object of this invention is to provide a novel joint between two nonparallel sheet metal plates.

A further object of this invention is to provide a novel method of forming securance tabs or flanges along the edges of metal plates without trimming away and discarding part of the original full thickness material.

A further object of this invention is to coin or pinchout securance tabs from the corner edges of the plates of a fabricated electric switch box.

My invention will be better understood from the following description taken in connection with the accompanying drawing, and its scope will be pointed out in the appended claims.

In the drawing:

Figure 1 is a perspective view of a completely assembled electric switch box embodying my invention.

Figure 2 is another perspective view of a switch box embodying my invention with one of the side plates removed.

Figure 3 is a plan view of a portion of the edge of one of the side plates of Figure 2.

Figure 4 is a view similar to Figure 3 after the tab has been coined or pinched-out of the edge of the plate.

Figure 5 is a view similar to Figure 4 except that the tab has been pierced so that it may receive a mating tab.

Figure 6 is a view similar to Figure 4 except that the tab has been trimmed so that it will mate with the pierced tab of Figure 5.

Figures 7–10 are edge views of the plates of Figures 3–6 respectively.

Figure 11 is a partial view showing the cooperating tabs of two adjacent plate members in near-mating relationship.

Figure 12 is a view similar to Figure 11 except that the male tab has been inserted in the pierced tab of the adjacent plate member.

Figure 13 is a view similar to that of Figure 12 with the head of the male tab riveted over to lock the plates together.

Figure 14 shows a final step in the operation where the edge of the pierced tab is folded over to form a square corner between the adjacent plate members.

Referring in detail to the drawing and in particular to Figure 2, the switch box embodying the invention is fabricated with a main U-shaped body 10 with a bottom wall 11 and opposed end walls 12 and 13. Similar side walls 14 and 15 are to be attached to the side edges of the body 10 to complete the assembly of an open four-sided electric switch box of sheet steel construction. This invention is primarily concerned with the means at several of the corner edges of the box for attaching the separate side plates 14 and 15 to the side edges of the body 10. This connection or joint is effected by a pair of cooperating tabs 16 and 18 on the adjacent plate members. These tabs are related in that they are formed originally by the same method, namely, by drawing or coining the edge of the plate with a suitable punch, as is best shown in Figures 3–10. This operation reduces the thickness of the plate material at that point, as seen in Figures 4 and 8, so that the excess material will flow outwardly to form a blank tab 19. This tab is either pierced by a slot 17, as seen in Figure 5 to form pierced tab 18, or it may be trimmed to form the mating male tab 16, as best shown in Figure 6.

The outward configuration of these tabs may be found in the prior art and the method of locking the adjacent plate members together is known and has been used in this art. However, in the past these tabs were formed by blanking out an oversized plate member and then trimming away the edges of the plate to leave the projecting tabs. The present invention is an improvement over the prior art methods in that it eliminates a design where there is a great deal of scrap material and it is also adaptable to automation where automatic machinery will cut out the three pieces of the box to the exact dimensions as shown, and completely assemble the parts with a consequent saving in labor costs.

First, the separate pieces are processed by providing them with knock-outs 20 of standard design which are generally circular portions that are struck-out or lanced with a punch which nearly removes them from the plate member except for the small unsheared section 21 which binds them to the plate material. After they are struck out they are then forced back into the plane of the plate member from which they were struck so that they lie flat and do not provide any protrusions from the surfaces thereof. These knock-outs 20 are designed for the convenience of the electrician who is to wire the box. Thus, the electrician need only remove as many knock-outs 20 as are necessary to accommodate the different cable ends and lead wires which are to be connected within the box. This avoids the necessity for providing the box with permanent cable-receiving openings in the walls of the box that might represent a fire hazard in the event of short circuit or severe arcing in the electrical system. Supports 22 on the outer edges of the walls 12 and 13 respectively are also provided for the box, and are arranged with tapped openings 23 so that a switch or convenience outlet may be mounted therefrom.

As a further step in the operation of manufacturing the present switch box, the edges of both the body 10 and the side plates 14 and 15 are coined by means of suitable multiple punches (not shown) so that the tabs 16 and 18 are extruded or pinched-out of the edges of the material. These tabs are subsequently pierced as at 17 or trimmed to form the mating pair of tabs 16 and 18. As is shown in Figures 11–14, the male tab 16 is inserted in the slot 17 of the pierced tab 18 and the head of the male tab is riveted over or bent or twisted, whichever is preferred, to lock the adjacent plate members together. As a final step in the assembly, the outer edge of the pierced tab 18 may be bent over so that the box is provided with a square outer corner.

Moreover, as illustrated on the drawing, the male tabs 16 are all provided on the side edges of the body 10 while the pierced tabs 18 are located on the edges of the plate members 14 and 15. Thus, it is possible to form the body 10 into a U-shaped member whereby the side plates 14 and 15 may be stack-fed from the sides by means of automatic machinery onto the outwardly protruding male tabs 16 of the body 10 and each joint finally established by riveting the head of the tab 16 and bending over the pierced tabs 18, all in one machine operation.

Accordingly, having described my invention of a novel locking means for a fabricated box, such as an electric switch box, it will be readily appreciated that I have been able to cut down the amount of scrap loss with my improved design and what is perhaps more important, I have provided a design which is simple and easy to manufacture with mass production methods because the separate side plates may be stack-fed from automatic machinery to an assembling machine which will complete the joints between the separate members. This design has resulted in both a material saving and a labor saving to reduce the final cost of the product appreciably over other known boxes in this art. The resulting box design is also of superior quality having interior wall surfaces which are absolutely smooth and square outer corners. These features increase the ease of wiring the box because it has a maximum volume, and they assist the electrician in installing the boxes in the wall since it is only necessary to cut a simple rectangular opening in the wall for exposing the front of the box.

While I have chosen to illustrate my invention in connection with an electric switch box comprising three separate parts, it should be readily appreciated that this invention is quite broad in its application and is useful whenever it is necessary to join two adjacent nonparallel plate members together. However, it is true, I believe, that the use of this invention is limited to ductile materials in a limited range of thicknesses. Thus, coined tabs would not be satisfactory in very thin sheet material nor usable at the other extreme with thick material. It is fortunate that the material used by the electric box industry is ideal for the application of this invention of producing tabs by coining, and that the strength requirements of such assemblies are within the limits of the securance means thus provided. It is contemplated that in the future improved methods will be found for coining the tabs and that this invention will find wide use in the art of metal boxes.

Moreover, this invention is not limited to the formation of relatively narrow tabs as shown, but it could be used effectively by rolling or otherwise extruding the entire edge of a plate member to establish a flange for joining two plate members together. Two interlocking tabs are also not necessary. The principal feature of this invention is that protruding tabs, flanges, or projections are formed on the edge of a metal plate by coining, rolling, extruding or pinching the edge for joining two plate members together.

Modifications of this invention will occur to those skilled in this art and it is to be understood, therefore, that this invention is not limited to the particular embodiments disclosed but that it is intended to cover all modifications which are within the true spirit and scope of the claims of this invention.

What I claim as new and desire to secure by Letters Patent of the United States is:

1. A device box comprising a main body member and at least one separate plate member that is to be attached thereto; the invention comprising the means for connecting the adjacent members together with at least one male tab on one member that is locked in a pierced tab on the adjacent member, the said tabs being coined from the edge of their respective members to lie within the plane thereof and leaving depressions on the outer surfaces of the members, so that the outer ends of the tabs may be folded into the depression of the adjacent member to form a square cornered box.

2. A metal box comprising a main U-shaped body member with a bottom wall and opposed end walls, and separate side plates attached to the body along the side edges thereof to form a complete box with an open top, and means for connecting the adjacent members together comprising male tabs that are coined from the edges of the main body member and lie within the plane of their supporting walls of the body member, and pierced tabs coined from the mating edges of the side plates, these pierced tabs also lying within the plane of each side plate, the male tabs extending through the pierced tabs of the side plates, the heads of the male tabs being deformed to hold the parts together.

References Cited in the file of this patent

UNITED STATES PATENTS

| | | |
|---|---|---|
| 926,246 | Dorff | June 29, 1909 |
| 938,373 | Eden | Oct. 26, 1909 |
| 1,420,694 | Gore | June 27, 1922 |
| 1,531,309 | Ryden | Mar. 31, 1925 |
| 1,557,066 | Krantz | Oct. 13, 1925 |
| 1,641,265 | Gaynor | Sept. 6, 1927 |
| 1,672,263 | Kruse | June 5, 1928 |
| 1,734,543 | Thomas | Nov. 5, 1929 |
| 2,530,849 | Wyatt et al. | Nov. 21, 1950 |